United States Patent

Nolte

[15] 3,640,136
[45] Feb. 8, 1972

[54] MASS FLOW RATE METER

[72] Inventor: Claude B. Nolte, Placentia, Calif.

[73] Assignee: Kingmann-White, Inc., Placentia, Calif.

[22] Filed: Sept. 11, 1969

[21] Appl. No.: 857,174

Related U.S. Application Data

[63] Continuation-in-part of Ser. No. 770,984, Oct. 28, 1968, abandoned.

[52] U.S. Cl. .................................................. 73/228
[51] Int. Cl. ................................................. G01f 1/00
[58] Field of Search ............................ 73/228; 222/55

[56] References Cited

UNITED STATES PATENTS

| | | | |
|---|---|---|---|
| 3,212,330 | 10/1965 | De Pollier | 73/228 |
| 3,232,486 | 2/1966 | Ofner | 73/228 X |
| 3,269,181 | 8/1966 | Seng | 73/228 |

FOREIGN PATENTS OR APPLICATIONS

| | | | |
|---|---|---|---|
| 527,785 | 10/1921 | France | 73/228 |

Primary Examiner—Jerry W. Myracle
Attorney—Howson and Howson

[57] ABSTRACT

Apparatus for measuring the mass flow rate of particulate matter, such as flour, salt, grains, soap powder, sand, gravel, cement, sawdust and the like, using an impact sensor onto which the particulate matter is dropped in free fall through a substantially constant predetermined height. The sensor has an upwardly directed sharp edge or point and inclined surfaces and moves bodily in a substantially straight line, vertical direction only. The particulate matter is directed by inclined surfaces against vertical guide surfaces which direct the particulate matter to drop vertically onto the inclined sensor surfaces through a substantially constant, free fall distance. The average impulse of force applied to the sensor by the dropping particulate matter deflects it vertically to provide a measure of the rate of mass flow of the particulate matter through the apparatus. The displacement of the sensor is small with respect to the distance of particulate fall.

27 Claims, 12 Drawing Figures

MASS FLOW RATE METER

RELATED APPLICATION

This application is a continuation-in-part of application Ser. No. 770,984, filed Oct. 28, 1968, for Mass Flow Rate Meter, and now abandoned.

BACKGROUND OF THE INVENTION

1. This invention pertains to meters and other apparatus for measuring, controlling and totalizing the mass flow rate of particulate material of various kinds.
2. The sensing of the mass flow rate of granulated or powdered material is particularly useful for the measurement of total flow of particulate matter in continuous industrial processes, for example, in measuring the mass flow rate of flour mill or in a bakery the mass flow rate of the various granular materials used in manufacturing cement, and a host of other applications in chemical plants, free processing plants, glass manufacturing works or processing plants, wood-processing mills and the like.

Previously the measurement of the flow of particulate matter has used such means as batch weighing, belt scales, screw feeders, and beam type measurement of momentum.

The batch-weighting method, while highly accurate, does not lend itself to continuous material handling. If the real value of particulate flow measurement is to be attained, it must be on a continuous basis analogous to the measurement of the flow of gas or liquid in pipes.

Belt scales are, as the name implies, a combination of an endless belt or conveyor with a weighing machine located under a portion of the endless belt and arranged to sense the weight of that portion of the material on the traveling belt that is immediately above the weighing machine. It is well known, however, that there is no simple and direct correlation between the output signal from the weighing machine and the true mass flow rate passing on the belt. The difference between maximum and minimum flow rate that can be accommodated with one calibration is very limited. A belt scale tends to be sensitive to changes in the humidity of the air as well as to the degree of moisture, or lack thereof, in the material being weighed. It should also be noted that the cost of a belt scale is relatively high compared, for example, to the device of this invention.

A screw feeder consists essentially of a tube, often inclined, with an auger shaped member inside the tube which is driven at a specific rotation rate, usually variable according to the requirements of the operator. The screw feeder is essentially a volumetric measuring device, rather than a mass measuring device and since the conduit in which the augerlike member operates may not be completely full at all times, it is relatively unreliable as a measuring mechanism.

In U.S. Pat. No. 1,558,668, issued Oct. 27, 1925, to C. W. Carter, a free-falling stream of grain impinges on a diagonally oriented plate, supported on the beam of a weighing scale. The momentum of the falling mass of grain acting on the lever, from the fulcrum of the scale to the point of impact on the plate, generates a torque which unbalances a scale, such unbalance being removed by relocation of a counterweight on the scale bar. In an apparatus of this type, the velocity of fall of the particulate matter is determined by the distance traveled in free fall by each particle and with the diagonally oriented plate, the falling particles travel different distances and hence have different velocities. The greater the quantity of material, the wider would be the difference between the paths of the particles so that the device is not linear with varying rates of flow. Additionally, particles falling on one portion of the impact plate would be impacting at a different distance from the fulcrum than other particles and this will also produce nonlinear performance with varying rates of flow.

Another embodiment of a beam balance device with a diagonal plate is shown in U.S. Pat. No. 1,728,429, issued Sept. 17, 1929, to G. G. Merchen. In addition to using a beam balance, Merchen extracts energy from the freely falling particles to control a gate, thereby decreasing the accuracy of the device.

In U.S. Pat. No. 3,056,293, issued Oct. 2, 1962, to F. R. Ofner, a sensor having a spherically shaped surface is attached to the end of a beam balance and placed in a position to intercept the falling flow of particulate material. In such a device, however, particulate matter tends to build up on top of the spherical sensor member, thereby causing a zero shift. Also, because the spherical sensor member is attached to a beam balance, the impact of particles on the outer side of the sensor member produces more torque on the beam balance than the same particle impacting on the inner side of the sensor member, while impacts on other portions of the sensor member at various distances from the fulcrum produce varying torques upon the beam balance, thereby producing nonlinear performances of the sensor with changing rates of flow.

Other patents using beam-mounted sensors of the momentum of particulate fall are Pollier U.S. Pat. Nos. 3,212,330 and Seay No. 3,269,181.

SUMMARY OF THE INVENTION

The device contemplated by this invention uses a conical or multisided pyramidal shaped impact sensor to measure the mass flow rate of particulate material. The particulate material is dropped from a predetermined height directly onto the inclined sensor surfaces. The sensor moves very little, and its deflection is substantially limited to a straight line, up and down direction so that particulate material striking any portion of the sensor has an equal effect upon its deflection. By making the initial velocity of the particulate material very small, and dropping it through a predetermined distance, the mass rate of flow of material becomes proportional to the impulse of force applied to the sensor.

The sensor may have its surfaces inclined at a constant angle, but preferably has the surfaces adjacent the sharp edge or point at a sharper angle than the surface where the particulate material leaves the sensor. The greater angle at the downstream edge of the sensor provides for the greater absorption of the energy of the falling particulate, while the sharper angle adjacent the apex prevents the building up of a dam or dune of material where it first meets the sensor. This sharper angle therefore prevents or lessens the tendency of the material to build up on the sensor and hence lowers the error to linearity from the weight of the material.

Further to prevent such buildup of material on the sensor, a low velocity airflow may be provided along the sensor surface to lessen the tendency of the material to build up where it is of a powdered or dusty nature.

One of the main features of the invention is that the particulate material is dropped from a predetermined height directly onto the surface of the sensor and this height remains constant regardless of the rate of flow of the material through the meter. There are provided elevated spreader surfaces adjacent the top of the meter, and vertical guide surfaces extending substantially through the distance of free fall of the particulate, with the spreader surfaces directing the particulate matter against the vertical guide surfaces which, in turn, direct the particulate matter to drop vertically onto the inclined sensor surfaces through a substantially constant free fall distance. The relation of the spreader surfaces to the vertical guide surfaces is such that the particulate reaches the guide surface on relatively low rates of flow as well as on high rates of flow, thereby promoting a linear response to the meter over the range of flow rates therethrough.

The vertical guide surfaces described above may be on an inner sleeve whose outer surface is engaged by the particulate material in its fall or on an outer sleeve whose inner surface is engaged by the particulate material in its fall. In either case, the spreader surfaces are located complementary to the location of the vertical guide surfaces, so as to direct the flow of particulate materials to the vertical guide surfaces. These vertical guide surfaces also limit the horizontal component of movement of the falling particulate material so that at the time it engages the sensor it has substantially only vertical movement attained by its fall through the predetermined height.

The momentum of the particles of matter falling through the meter will be absorbed by the sensor and converted into an impulse force which is measured. The individual impulses of force due to the individual particles occur rapidly and continuously, resulting in a continuous force proportional to the mass flow rate of the particulate material being received by the sensor and measured by its deflection.

While the particulate material will, in the main, follow the vertical guide surfaces through its distance of free fall, to prevent any particles bouncing or being otherwise misdirected so as not to fall on the sensor, an outer vertical guide may be spaced from the inner vertical guide above described so as to insure that all the particulate material will be directed onto the sensor surface. In this arrangement, the space between the vertical guides becomes the space within which the particulate falls to the sensor surface, with all of the momentum of the dropping particles transferred to the sensor.

The sensor is preferably substantially symmetrical about the central vertical axis of the apparatus and its movement is substantially limited to a straight line, up and down direction therealong, whereby particulate material striking any portion of the sensor surface causes straight line, downward deflection in accordance with its momentum and the rate of the opposing range spring. Thus, no variation in scale factor occurs due to the particles striking different portions of the sensor surface, as distinguished from those prior art devices wherein the sensor is connected to a beam balance and in which deflection of the balance depends upon the lever arm position where the particles strike the sensor.

When the surface of the sensor in inelastic, it may be dented or scored by the particles of the material, and to prevent this, a flange may be placed around the bottom edge of the sloping sensor surface to trap a portion of the dropping particulate material, thereby to build up a surface of the particulate material on the sensor surface to protect it and itself and also to provide a surface inelastic to additional dropping particulate material.

While a preferred embodiment of the sensor of this invention has been described as having a different angular relation adjacent the apex and at the downstream edge, it will be understood that instead of sharp angles, the surfaces may be obtained by a continuous curve from the apex to the downstream edge of the sensor.

In one embodiment of the invention, the sensor is conical and the spreader surface is frustoconical, with its downstream edge circular. In an alternative embodiment of the invention, the sensor is a multisided pyramid, with a spreader surface comprising a plurality of substantially flat, downwardly sloping adjoining surfaces, and the downstream edge of the spreader being multisided, with each side substantially straight and parallel to a side of the sensor. In each case, the vertical guide surface, which may be of inner or outer form, conforms to the shapes of the sensor and spreader surfaces, that is, in the case of the conical sensor, the vertical guide will be cylindrical, and in the case of the pyramidal sensor, the vertical guide will be multisided and parallel to the sides of the sensor.

The invention also contemplates supplying low-pressure air interiorly of the vertical guide to exit between the bottom thereof and the sensor surface to prevent accumulation of material on the sensor surface adjacent the bottom of the vertical guide.

In one of the embodiments of the invention, the sensor is rotated slowly to aid the particulate material to slide slowly off the sensor.

The invention optionally provides downwardly inclined slots in the sensor impact surface and flows air gently therethrough to aid flow of material over the sensor surface.

In another embodiment of the invention, substantially the entire flow meter is positioned within a conduit mounted on a slide or rail so as to be bodily removable from the conduit for servicing or calibration without interrupting the flow of particulate matter through the conduit.

Deflection of the sensor, in one embodiment of the invention, is opposed by a calibrated range spring. In another embodiment of the invention, the sensor deflection is sensed, and the sensor is servoed through an amplifier and forcing means to return the sensor substantially to its zero position, the restoring force being proportional to the mass flow rate of the particulate material.

An instantaneous reading of the mass flow rates may be obtained by displaying the amount of deflection of the sensor in an indicator. The indicator may be connected mechanically to the sensor, or the movement of the sensor may be detected by electrical devices and the indicator may be a voltage or current meter. Further, mechanical or electrical linkages may be used to feed the sensor deflection into a recording meter or graph or into a totalizer.

It is apparent also that the output signal of the sensor may be used in conjunction with control systems to control the mass rate of flow by controlling conveyor speed, hopper vibration, or the like.

The above and other objects and features of this invention will be apparent from the following specification and the appended drawings.

DESCRIPTION OF THE PREFERRED EMBODIMENTS

Figures 1, 2, 2A, 3, 4:
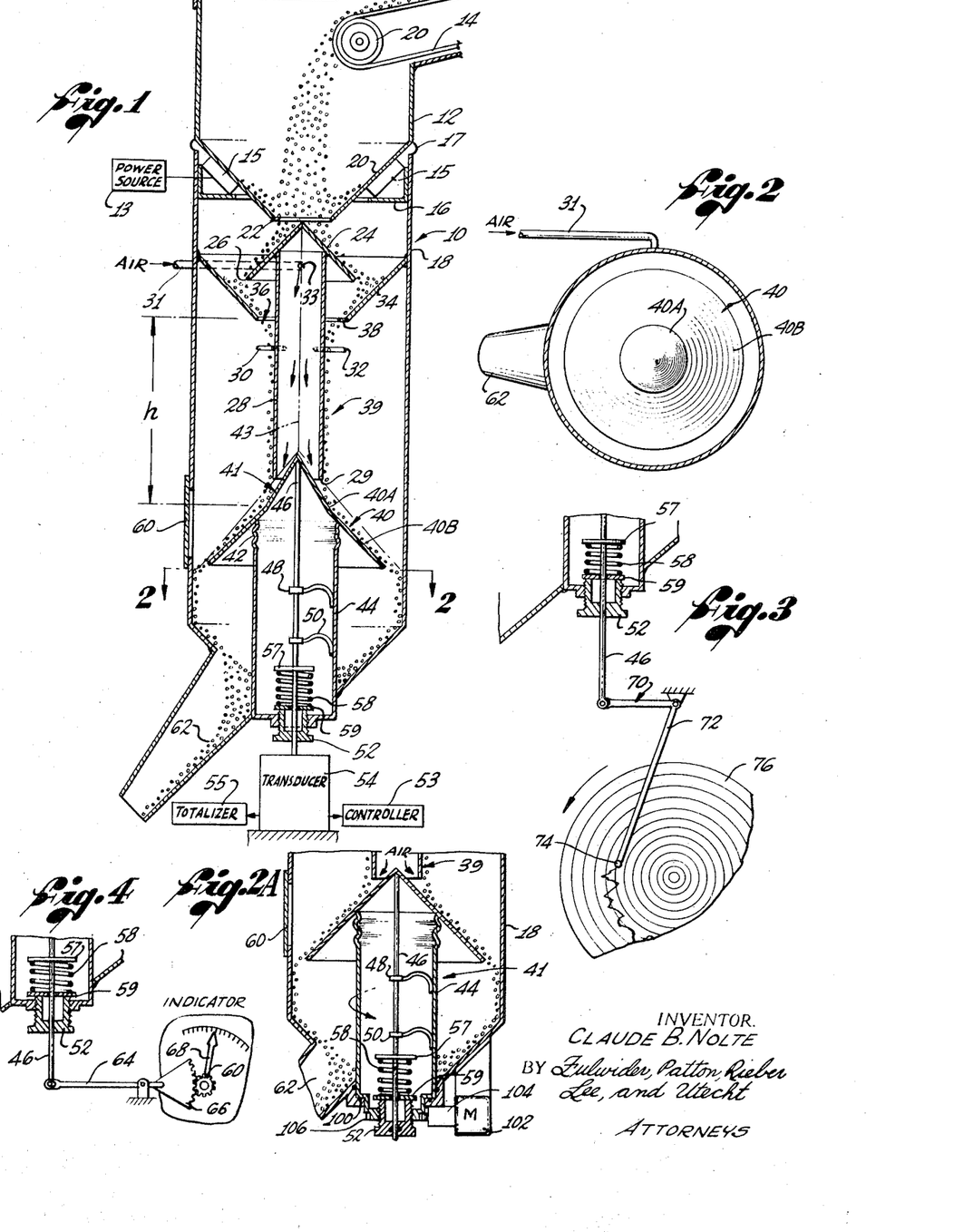
FIG. 1 is a generally schematic, vertical sectional view of a first embodiment of the present invention.
FIG. 2 is a horizontal sectional view, partly in plan, taken at 2—2 in FIG. 1.
FIG. 2A is a view similar to the bottom portion of FIG. 1, modified to cause rotation of the sensor.
FIG. 3 is a view of a first mechanical linkage to the sensor of this invention, adapted to operate a recording pen.
FIG. 4 is a view of a second mechanical linkage to the sensor of this invention, adapted to operate a pointer.

In FIG. 1, a closed vertical housing 10 is adapted to receive particulate material at an upper end thereof and to discharge it from its lower end. In the interior of the housing 10 is located the flow meter apparatus of this invention which is adapted and positioned to measure the mass flow of the particulate material through the housing 10.

The upper end of the housing 10 constitutes a hopper 12 which is adapted to receive particulate material which is delivered thereto, for example, by a conveyor belt 14 driven by a controllable motor 20. The hopper 12 may be supported directly upon the wall 18 of the housing 10, or it may be supported through vibrator elements 15. The hopper 12 has a central opening 22 through which the particulate material may pour. The vibrator elements 15 are supported upon shelves 16 attached to the wall 18 and, in turn, support the hopper 12, particularly on the slide portion 20 thereof. The vibrators 15 may, for example, be electromagnetic vibrators driven from a power source 13, or, they can be mechanically operated as from a motor-driven cam. A closure 17 between the wall 18 and the hopper 12 may, for example, be a bellows or some other flexible structure which does not interfere with hopper vibration.

Positioned near and under the opening 22 is a baffle 24 which receives the particulate matter from the hopper 12 and redirects it outwardly toward the wall 18. The baffle, typically, is conical, or in the shape of a multisided pyramid, with its apex substantially under the center of opening 22. Depending downwardly from the under side of the baffle 24 is closed, substantially cylindrical or multisided vertical guide 28 which supports the baffle 24 and also prevents particulate material from having a significant component of inward horizontal velocity.

The vertical guide 28 and baffle 24 are supported by a wall 18 on thin rod supports 30 and 32 which should be strong enough to support the load, but small enough to avoid interfering with the flow of particulate material. Alternatively, a baffle 24 could be supported by other elements of the apparatus.

Immediately below the lip 26 of the baffle 24 is mounted a spreader 34 supported by the wall 18 and serving to redirect the flow of particulate material toward the center of the apparatus and against the vertical guide 28. The spreader 34 has a central opening 36 through which extends the vertical guide 28, with the clearance between the guide 28 and the lip 38 of the spreader forming an opening through which the particulate matter spills. The spreader 34 is arranged to direct the particulate material against the vertical guide 28 at all rates of particulate flow.

A sensor 41 is positioned immediately below the opening 36 to receive the particulate material. The impact surface 40 of sensor 41 may be shaped as a cone, a multisided pyramid, or a double sided ridge. The geometrical shapes of the impact surface 40, the lip 38 and the vertical guide 28 should be complementary to insure that the distance of fall of the particulate material 39 is substantially the same whether the particle happens to be adjacent the lip 38 or at the top of the surface of spill of the pouring material.

The impact surface 40 of the sensor 41 is illustrated in FIG. 1 as having two angles of inclination; the first adjacent the apex 40A receives the first impact of the material flowing down the outer surface of the vertical guide 28 and the sharp angle prevents the build up of a dam or dune of material at the point of engagement of the particulate material with the sensor surface. The surface of the sensor downstream from the apex at 40B is preferably inclined at a greater angle to the vertical to absorb a greater portion of the energy of the falling particulate. Although no limits are to be placed upon the angularity of the surfaces 40A and 40B, by way of example only, the surface 40A may be inclined at an angle of 30° from the vertical and the surface 40B at an angle of 45° to the vertical. Alternatively, the surfaces 40A and 40B may be combined into a smooth curve from the apex to the downstream edge of the sensor while retaining the same relative angular relation of the particulate-engaging and particulate-leaving surfaces.

The lower edge 29 of the vertical guide 28 terminates closely adjacent the sensor surface 40A, and where the particulate is of powdered or dusty material, it may be desired to flow low velocity air between the edge 29 and the sensor surface 40A to prevent the build up of material thereat which would increase the weight on the sensor. Such low velocity air may be directed to the central chamber within the vertical guide 28 from a pipe 31 communicating with the chamber within the vertical guide 33.

The sensor 41 is supported vertically by a push rod 46 which has a limited straight line vertical excursion or deflection only. This limited vertical movement along the central axis 43 substantially without side movement is provided by flexible supports 48 and 50 connected to a housing 44 and is similar to a Cardon hinge. The housing 44 is attached to and supported by the outer housing 10 and bellows 42 is used to seal the housing 44 and its contained equipment from dust and other particulate matter.

The push rod 46 and the sensor 41 are biased upwardly by a compression range spring 58 which is positioned between a flange 57, attached to the rod 46, and a flange 59, positioned on the end of an adjusting nut 52 through which the rod passes for attachment to a transducer 54, which produces a signal that is a measure of the axial movement of the sensor and the mass rate of flow of the particulate material.

An opening closed by a door 60 is provided through the wall 18 to give access to the sensor for servicing and calibration.

The bottom of the housing 10 has at least one outlet orifice 62 through which the particulate matter exits after being metered.

The output of the transducer 54 may be an electrical output, for example, from a sensitive electrical pickoff which produces an electrical signal indicative of the displacement of the sensor 41, and hence of the mass flow rate of the particulate material through the apparatus. The output of such a transducer can be connected to a controller 53 to control the mass rate of flow at the input, e.g., by controlling the speed of the motor 20 of the conveyor belt 14, the power or speed of the vibrator 15, or other items.

The output of the transducer 54 may also be connected to a totalizer 55 which, in effect, integrates the output signal with time to produce a measure of total mass flow of the particulate material.

Alternatively, the rod or plunger 46 may be connected as in FIG. 4 through a lever 64, having a segmented gear 66 on one end thereof meshing with a pinion 60 connected to a pointer 68 whose reading is indicative of the mass rate of flow of particulate matter through the apparatus.

In another embodiment, the rod 46 may be connected as in FIG. 3 through a bellcrank lever 70 whose arm 72 supports a recording pen 74 which inks a permanent record on a rotating chart 76.

In still another embodiment, the rod or plunger 46 may be connected to a pneumatic or hydraulic position or force sensor (not shown) to generate a pneumatic or hydraulic signal proportional to the mass rate of flow of the particulate matter.

In the embodiment shown in FIG. 2A, the housing 44, sensor 41, spring 58, and push rod 46 are supported for rotation relative to the housing 10 upon bearings which are shown generally at 100. The housing 44 group is rotated by a motor 102 through a gearbox 104 driving a gear 106, which is attached to the housing 44. Such rotation facilitates sliding of the particulate material off the impact surface 40.

Figure 5:
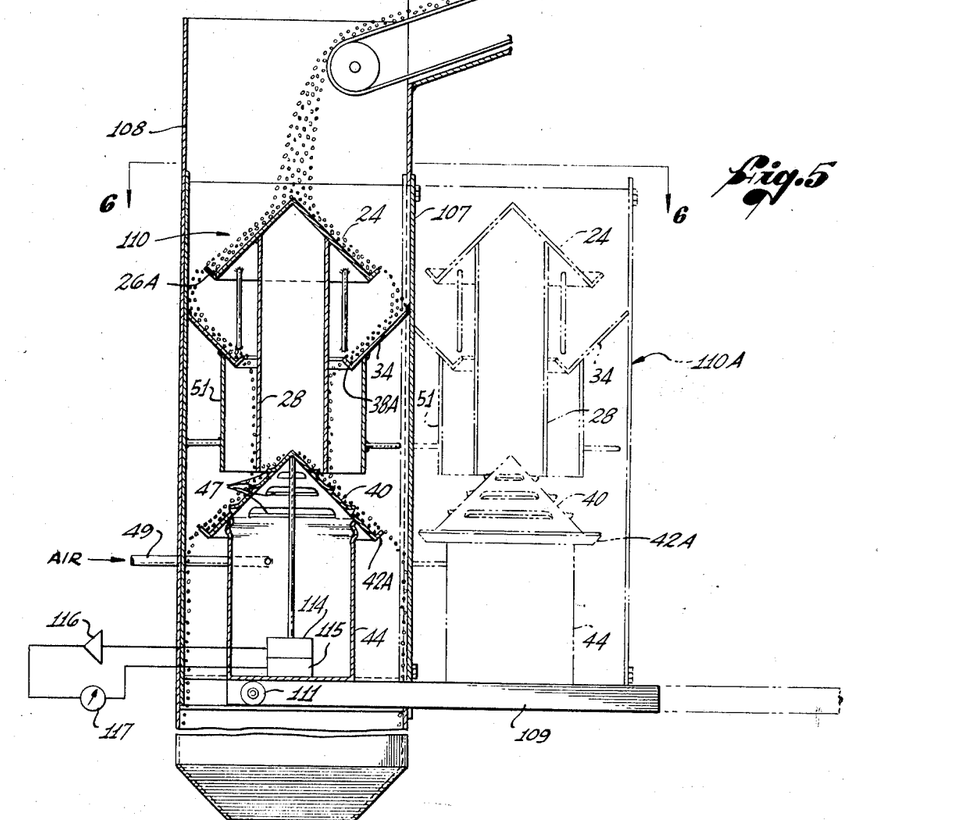
FIG. 5 is a generally schematic, vertical sectional view of a second embodiment of the present invention wherein the sensor is readily removed from and inserted into the apparatus without interrupting particulate flow, and further showing additional features of the invention which may also be incorporated into the embodiment of FIG. 1.
Figure 6:
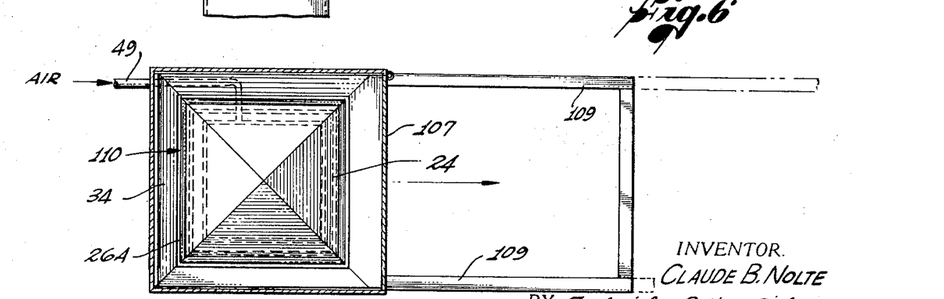
FIG. 6 is a horizontal sectional view taken at 6—6 in FIG. 5.

Referring now to FIGS. 5 and 6, a removable sensor assembly 110 is shown positioned within a housing conduit 108. The sensor assembly 110 may include a right-hand supporting wall 107 which serves as a door in the inner position of the assembly to close a side opening into a conduit 108 through which the assembly may be removed into the dotted line position of FIG. 5 for servicing and calibration without interrupting the flow of particulate material through the conduit 108. For this purpose, the sensor assembly desirably rolls on wheels 111 on supporting rails 109 into and out of the conduit.

The elements of the sensor assembly 110 are generally the same as those shown, for example, in FIG. 1, but with certain alternative features also illustrated.

Some of the additional features of the embodiment of FIGS. 5 and 6 are the placing of the flange 42A on the lower perimeter of the sensor impact surface 40, the placing of a flange 38A at the lip of the spreader 34, and the placing of a flange 26A at the lip of the baffle 24. In a similar fashion, a flange could be placed at the bottom lip of the hopper surface 20 of FIG. 1. The flanges 26A, 38A and 42A causes particulate material to accumulate on the surfaces of the baffle 24, the spreader 34, and the impact surface 40, thereby protecting the surfaces from abrasion, dents, gouging, and the like. This is particularly important on the impact surface 40 if it is made of inelastic material which usually is malleable and susceptible to abrasion, dents and gouging.

Another feature of the invention shown in FIG. 5 and also usable in the embodiment of FIG. 1, is an electrical position sensor 114, connected to drive a servo amplifier 116, which, in turn, drives an inductive forcer 115 to return the sensor to its null position. The reading of the ammeter 117 is a measure of the force exerted by the forcer 115, and hence of the mass flow rate of the particulate material.

The impact surface 40 of FIG. 5 is shown with a single angle of deflection corresponding to the portion 40B of FIG. 1, but it is understood that it may have a sharper angle at the apex, as in the FIG. 1 embodiment. An additional feature shown in FIG. 5 is the providing of the impact surface 40 with a plurality of downwardly inclined slots 47 communicating with the chamber within the housing 44 which is connected by a pipe 49 to a source of low pressure air. Air exiting through the slots 47 helps in the flow of the particulate material over the impact surface 40.

An additional feature in FIG. 5 is the provision of an outer sleeve 51 concentric with the inner vertical guide 28 and positioned to insure that any material which strays from the vertical guide will be retained within the outer sleeve 51 and deposited on the surface of the sensor.

Figure 7:
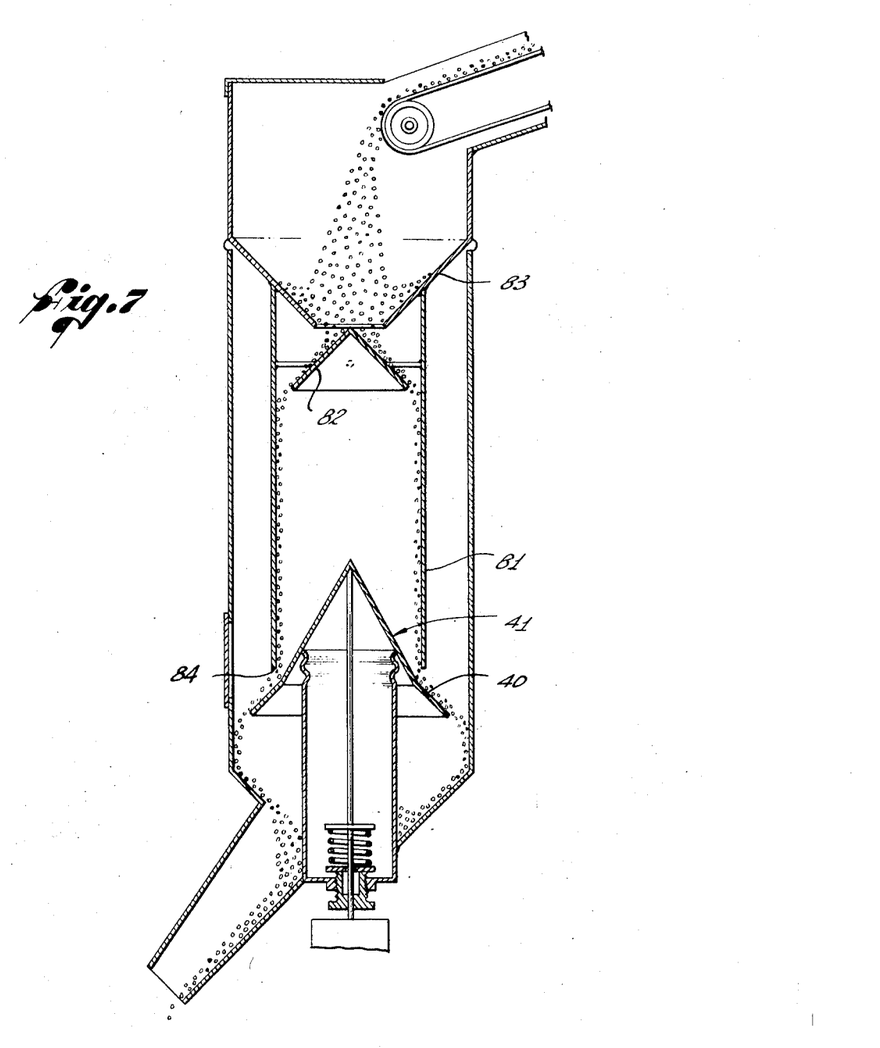
FIG. 7 is a generally schematic, vertical sectional view of an embodiment of the present invention using an outer vertical guide providing interior guide surfaces.

In the FIG. 7 embodiment, the position of the internal vertical guide 28 has been reversed to an outer vertical guide 81 against whose interior surface the particulate material is directed by an interior bafflelike spreader 82 upon whose surface the particulate material is directed from an upper hopper 83 at the top of the meter. The sensor 41 may be like that in any of the figures previously described, and the spreader 82 and exterior vertical guide 81 are constructed so that the particulate material is directed against the interior surface of the vertical guide 81 regardless of the rate of flow of the particulate material through the meter. With such an arrangement, the material always hits the sensor at substantially the same vertical point beneath the edge 84 of the vertical guide 81, this edge being disposed substantially adjacent the impact surface 40 of the sensor. In effect, FIG. 7 moves the spreader and vertical guide of FIG. 1 inside out, that is, from the interior guide 28 and outer spreader 34 to an inner spreader 82 and an outer vertical guide 81. In both cases, the particulate material is guided down the surface of the vertical guide into engagement with the sensor impact surface at substantially the same vertical point, regardless of the rate of flow, thereby promoting linearity of response in the meter.

In the operation of the embodiment of FIG. 1, the particulate material is deposited by a conveyor 14 in the hopper 12 and drops through opening 22 onto the baffle 24 which interrupts any vertical component of velocity the particles may have developed in their travel through the hopper 12 and directs the flow outwardly. Next, the material falls onto the spreader 34 which reverses its direction of flow, passing the material to the lip 38 above the impact surface 40 of the sensor 41. Since the spreader 34 directs the particulate material against the outer surface of the vertical guide 28, the various particles fall the same vertical distance adjacent the vertical guide 28 and strike the impact surface 40 of the sensor 41 at the same vertical point substantially beneath the edge 29 of the vertical guide. As the particulate material free falls through this vertical distance, each particle attains substantially the same velocity and a momentum which is the product of its velocity and mass. With change in mass of the total particulate falling, the total momentum will change, and hence the response of the sensor 41. In striking the impact surface 40, each particle exerts an impulsive force proportional to its momentum and the aggregate of the impulses of force is proportional to the mass rate of flow of the particulate material.

In a particular apparatus it may be desirable to have the vibrator 15 used continuously or intermittently at the option of the operator. The vibrator facilitates the transfer of the particulate material through the apparatus when the particulate material tends to clog.

Figure 8:
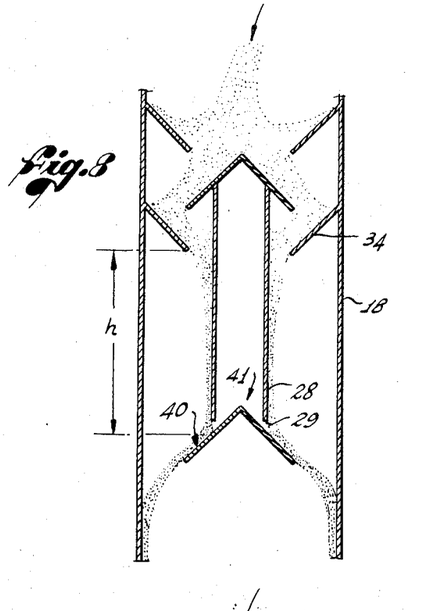
FIG. 8 is a diagrammatic representation of a large mass flow rate using the apparatus of FIG. 1.
Figure 8A:
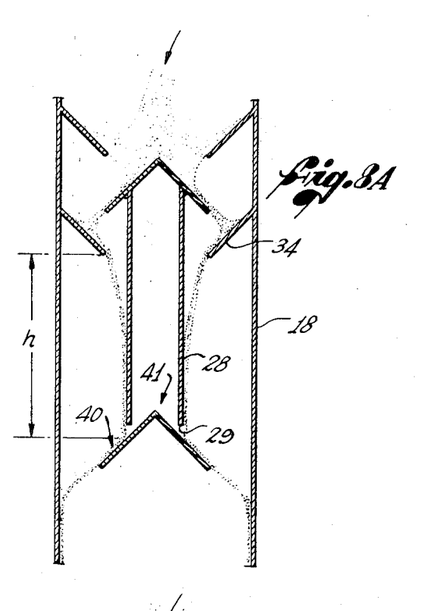
FIG. 8A is a view similar to FIG. 8 representing a low flow rate and showing free fall of the particulate through the same distance as in FIG. 8.

The function of the vertical guide 28 (and also of the outer vertical guide 81 of FIG. 7) is to direct the flow of particulate material to substantially the same vertical point on the sensor 41 regardless of the rate of flow of the material. This operation is illustrated in FIGS. 8 and 8A, FIG. 8 illustrating a high rate of flow and FIG. 8A illustrating a low rate of flow. In both FIGS. 8 and 8A it is seen that the particulate material is directed by the spreader 34 into engagement with the outer surface of the vertical guide 28 so that the flow is downwardly along this surface into engagement with the impact surface 40 of sensor 41 substantially beneath the edge 29 of the vertical guide. As illustrated in the drawings, this corresponds to a free fall vertical distance of $h$, between the lip of the spreader 34 and the point of engagement with the impact surface 40, and is the same in both cases, that is, independent of the rate of flow. This promotes linearity of response of the meter, since the free fall vertical height is substantially the same at low and high rates of flow.

Figure 9:
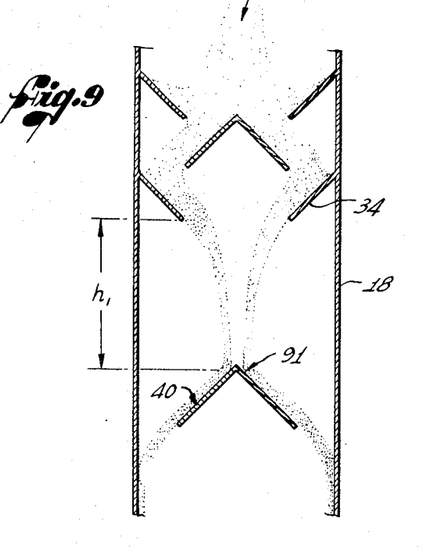
FIG. 9 is a view similar to FIG. 8 and representing the same rate of flow, but without the vertical guide surfaces.
Figure 9A:
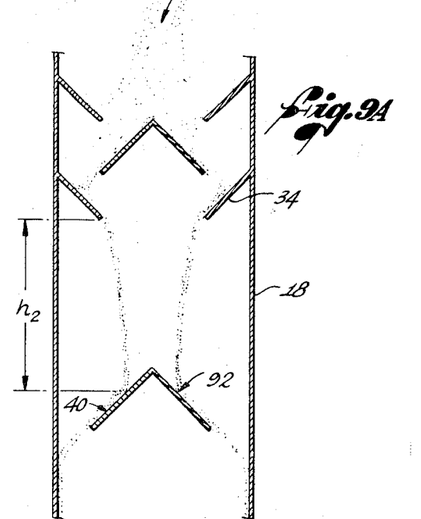
FIG. 9A is a view similar to FIG. 8A and of the same rate of flow, but without the vertical guide surfaces and showing a considerably greater distance of free fall than in the higher flow rate condition of FIG. 9.

FIGS. 9 and 9A illustrate what would be the condition, absent the vertical guide 28, for different rates of flow. Thus, FIG. 9 shows a high rate of flow of particulate material directed inwardly by the spreader 34 to engage the impact surface 40 of the sensor adjacent the apex substantially at a point 91, corresponding to a free fall height of $h_1$. In FIG. 9A, a low rate of flow condition without the vertical guide 28 is illustrated. Here the particulate material engages the sensor impact surface 40 a substantial distance from the apex at 92, corresponding to a free fall height $h_2$. It can readily be seen that $h_1$ is substantially less than $h_2$ so that the velocity and momentum of the individual particles in FIG. 9 are substantially less than in FIG. 9A, thereby destroying the linearity of response of the meter.

It can thus be seen that there are two important general features of the meter of this invention. One, the use of the vertical guide against whose surface the particulate material is directed and along which it free falls to engage the impact surface of the sensor at substantially the same vertical height (to maintain a substantially constant distance of free fall) regardless of the rate of flow of the particulate. Two, the straight line, vertical movement of the sensor so that it is immaterial where the particulate material hits the impact surface of the sensor laterally, a response which is not true of the beam mounted sensors which are sensitive to the direction of input of the material and particularly to the distance of the point of impact from the rotational axis of the beam.

The material transferring capacity of the opening between the aperture 22 and the upper surface of the baffle 24 is preferably substantially less than the lower passages in the apparatus to prevent the lower passages from being overloaded with flowing material. That is, the space between the lip of the surface 20 and the upper surface of the baffle 24 limits the flow of material to the apparatus. The directions of the surface 20 and the upper surface of the baffle 24 are oriented to cause the particulate material to turn through an angle which is approximately 90° and in a similar fashion, the surfaces of the spreader 34 and of the baffle 24 are directed such that particulate matter flowing over the surface of the baffle 24 in a downward and radially outward direction changes to a downward and radially inward direction, turning through an angle of substantially 90°.

In a typical design, the distance of free fall between the lip 38 and the point of impact of the particulate material on the impact sensor surface 40 is on the order of 12 inches. The travel of the sensor 44 is limited by the constant of the compression spring 58 and is typically of the order of 0.1 inch. It is small compared to the distance of free fall and does not materially affect the accuracy of response. The effective change in calibration due to variation in free fall distance of particulate matter at a flow rate near zero versus the distance near maximum capacity is of the order of ±0.25 percent. The variation is nonlinear but may be partly removed with resulting variations of 0.1 percent to 0.15 percent in the working range. Hence, the device produces an output linear with mass flow from essentially zero, say 4 percent capacity, to 100 percent capacity.

By selecting the strength or rate of the compression spring 58, the range of operation of the device can easily be altered by a 2:1 ratio. However, for substantial changes in capacity, the entire mechanism would preferably be made larger or smaller.

Thus, the sensor of this invention is a particularly accurate one, overcoming the disadvantages of the prior art devices by carefully controlling the distance of free fall of the particulate material onto the impact surface of the sensor, and by positioning the sensor so that all sensing movements are straight line vertical.

It is also an important feature of the invention that the sensor may readily be removed from a conduit carrying particulate material, without interrupting the flow, for servicing, calibration, and modification.

Although the invention has been described in detail above, it is not intended that the invention should be limited by that description, as many variations will be apparent to those skilled in the art.

I claim:
1. A flow meter for measuring the mass rate of flow of particulate material comprising: a sensor having an inclined impact surface, means mounting said sensor for substantially vertical movement, means opposing downward movement of said sensor, distributor means spaced above said sensor and terminating in a discharge lip for dropping the particulate material whose mass rate of flow is to be measured onto said sensor, the discharge lip of said distributor means positioned in a substantially horizontal predetermined plane, means for measuring the downward force exerted on the sensor by the particulate material falling thereon and thereby the mass rate of flow of particulate material through the meter, the impact surface of said sensor having a predetermined impact area in the form of a narrow elongated band substantially parallel to the plane of the discharge lip of said distributor means, and flow directing means to direct the fall of the particulate material passing over the discharge lip of said distributor onto the said predetermined impact area of said sensor impact surface so that individual particles of said particulate material strike the impact surface at substantially the same velocity as each other particle and that the same proportion of the velocity head of each particle is converted to a downward impulse of force on the sensor.

2. A flow meter in accordance with claim 1 in which the means mounting said sensor support said sensor for movement only in a straight line vertical direction excluding rotational force about a definite axis.

3. A flow meter in accordance with claim 1 in which the flow directing means includes a guide member having at least a portion thereof positioned intermediate the discharge lip of said distributor means and the impact surface of said sensor.

4. A flow meter in accordance with claim 1 in which the distributor means has a downwardly inclined surface terminating at the discharge lip and in which the inclined surface of said distributor means extends in a direction substantially normal to the inclined impact surface of said sensor.

5. A flow meter in accordance with claim 1 in which said distributor means further includes means for limiting the initial downwardly directed velocity of the particulate material leaving the discharge lip of said distributor means.

6. A flow meter in accordance with claim 1 in which common support means is provided for said distributor means, said flow directing means and said sensor, a vertical conduit is provided to carry the particulate material to and from said flow meter, and means mounting said common support means for movement relative to said vertical conduit to permit movement of said flow meter into and out of said conduit without interrupting flow of the particulate material through said conduit.

7. The flow meter defined in claim 1 including:
means providing downwardly inclined slots in said sensor impact surface; and
means for introducing air interiorly of the sensor to exit through said slots to aid material flow over the sensor surface.

8. Apparatus as recited in claim 1 and further comprising means for rotating said sensor about its vertical axis.

9. The flow meter defined in claim 1 including:
said sensor impact surface providing a relatively sharper angle at said impact area where first engaged by the falling material and a relatively flatter angle where the material leaves the sensor surface.

10. Apparatus as recited in claim 1 in which said means opposing downward movement of the sensor is an adjustable spring.

11. Apparatus as recited in claim 1 including:
means including a lever mechanism for transmitting the motion of said sensor to an indicator.

12. Apparatus as recited in claim 1 and further comprising:
means for forcing said sensor impact surface in an upward direction; and
servo means connected between said means responsive to movement of the sensor and said forcing means to cause said forcing means to maintain the sensor substantially in its undeflected position.

13. Apparatus as recited in claim 1 including:
a flange on the lower edge of said sensor impact surface adapted to retain particulate material of sufficient depth to protect said impact surface.

14. Apparatus as recited in claim 1 in which said sensor impact surface is substantially conical.

15. Apparatus as recited in claim 1 in which said sensor impact surface is a multisided pyramid.

16. A flow meter for measuring the mass rate of flow of particulate material, a sensor having an inclined impact surface, means mounting said sensor for movement only in a straight line vertical direction excluding rotational movement about a definite axis, means opposing downward movement of said sensor, distributor means for dropping the particulate material whose mass rate of flow is to be measured onto said sensor impact surface at a substantially definite impact velocity to exert a downward force on the sensor having no movement to rotate the sensor bodily about a definite axis, said distributor means including a downwardly sloping member having a central opening therethrough and a vertical sleeve positioned interiorly of the central opening of said downwardly sloping member and providing a vertical surface against which the material is directed to cause the material to fall substantially the same vertical height on the sensor impact surface regardless of the rate of flow of the material, and means responsive to the force on said sensor and thereby responsive to said mass flow rate independently of the lateral position of the point of impact of said material on the sensor impact surface as long as said definite impact velocity of said particulate material remains the same for indicating said mass rate of flow.

17. A flow meter in accordance with claim 16 in which said vertical sleeve is in the form of an axial guidetube extending through the central opening of said spreader and downwardly into close proximity with said sensor impact surface to limit inward movement of the particulate material.

18. A flow meter as recited in claim 16 including:
means for limiting the initial velocity of said particulate material comprising a baffle for applying particulate material to said spreader, positioned and oriented to cause said particulate material to turn through substantially 90°.

19. The flow meter defined in claim 16 including:
means for introducing air into said vertical sleeve to exit between the bottom of the sleeve and the sensor impact surface to inhibit the accumulation of material on the sensor impact surface adjacent the bottom of the sleeve.

20. Apparatus as recited in claim 17 and further comprising:

a skirt extending downward surrounding said guide tube and into the region of said sensor impact surface to limit outward movement of said particulate material.

21. A flow meter for measuring the mass rate of flow of particulate material comprising:
 a sensor having an inclined impact surface;
 means mounting said sensor for substantially vertical movement;
 means opposing downward movement of said sensor;
 means for dropping particulate material, whose mass rate of flow is to be measured, through a predetermined distance of free fall onto said impact surface to generate a downward force on the sensor;
 means for measuring the downward force on the sensor and thereby the mass rate of flow through the meter;
 a vertical guide surface above the sensor impact surface; and
 means for directing the flow of particulate material against said vertical guide surface at substantially all rates of flow so that the material strikes the impact surface at substantially the same height to make the distance of free fall substantially independent of the rate of flow.

22. The flow meter defined in claim 21 including:
 said sensor mounting means restricting it to straight line, vertical movement only.

23. The flow meter defined in claim 21 in which:
 said vertical guide surface is provided by an inner sleeve extending vertically downward to a position adjacent the sensor impact surface; and
 said directing means comprises an inclined spreader at the outside of said sleeve and directing the material inwardly against the sleeve surface.

24. The flow meter defined in claim 23 including:
 a central baffle above said spreader and having the baffle surface inclined at substantially 90° to the spreader surface for interrupting the vertical component of velocity of flow above the spreader.

25. The flow meter defined in claim 23 including:
 means for introducing air into said sleeve to exit between the bottom end of the sleeve and the adjacent sensor impact surface to inhibit the accumulation of material on the sensor surface adjacent the bottom of the sleeve.

26. The flow meter defined in claim 21 in which:
 said vertical guide surface is provided by an outer sleeve extending downward to a position adjacent the sensor impact surface; and
 said directing means comprises a central inclined baffle directing the material outwardly against the sleeve surface.

27. A flow meter for measuring the mass rate of flow of particulate material comprising: a sensor having an inclined impact surface, distributor means spaced above said sensor and terminating in a discharge lip for dropping the particulate material whose mass rate of flow is to be measured onto said sensor, the discharge lip of said distributor means positioned in a substantially horizontal predetermined plane, the impact surface of said sensor having a predetermined impact area in the form of a narrow elongated band substantially parallel to the plane of the discharge lip of said distributor means, flow directing means to direct the fall of the particulate material passing over the discharge lip of said distributor onto the said predetermined impact area of said sensor impact surface so that individual particles of said particulate material strike the impact surface at substantially the same velocity as each other particle and that the same proportion of the velocity head of each particle is converted to a downward impulse of force on the sensor, and a force balance supporting the sensor in a predetermined position to measure the downward force exerted on the sensor by the particulate material and thereby the mass rate of flow of particulate material through the meter, said force balance operable to resist downward movement of the sensor due to the impact of the particulate material on said sensor and maintain said sensor in substantially said predetermined position.

* * * * *